United States Patent [19]

Lyon

[11] Patent Number: 4,794,759
[45] Date of Patent: Jan. 3, 1989

[54] TURBOCHARGER CONTROL

[75] Inventor: Kim M. Lyon, Bloomfield Hills, Mich.

[73] Assignee: Chrysler Motors Corporation, Highland Park, Mich.

[21] Appl. No.: 87,730

[22] Filed: Aug. 21, 1987

[51] Int. Cl.$^4$ .................................... F02B 37/12
[52] U.S. Cl. .................................... 60/602
[58] Field of Search .................. 60/600, 601, 602, 603

[56] References Cited

U.S. PATENT DOCUMENTS

| 4,179,247 | 12/1979 | Osborn | 417/406 |
|---|---|---|---|
| 4,378,960 | 4/1983 | Lenz | 415/115 |
| 4,403,913 | 9/1983 | Fisker | 415/150 |
| 4,471,616 | 9/1984 | Boudy | 60/611 |
| 4,490,622 | 12/1984 | Osborn | 60/602 X |
| 4,516,401 | 5/1985 | Jackson | 60/602 |
| 4,535,592 | 8/1985 | Zinsmeyer | 60/597 |
| 4,597,264 | 7/1986 | Cipolla | 60/602 |
| 4,671,068 | 6/1987 | Moody et al. | 60/602 |

FOREIGN PATENT DOCUMENTS

| 108413 | 7/1982 | Japan | 60/602 |
|---|---|---|---|
| 180031 | 10/1984 | Japan | 60/602 |

OTHER PUBLICATIONS

SAE Paper No. 860107, Variable Geometry Turbocharging with Electronic Control, Moody, Feb. 1986.

Primary Examiner—Michael Koczo
Attorney, Agent, or Firm—Kenneth H. MacLean, Jr.

[57] ABSTRACT

This application concerns a turbocharger control system and apparatus in association with a variable exhaust flow type turbocharger in which flow regulating turbine inlet vanes are positioned. The control includes a fluid pressure responsive device for actively positioning the inlet vanes. The device responds to opposing fluid pressure generated forces both of which are regulated in accordance with a program responsive to engine and vehicle parameters. The fluid pressures are the engine's intake manifold vacuum or pressure and the turbocharger's compressor output.

6 Claims, 4 Drawing Sheets

4,794,759

TURBOCHARGER CONTROL

BACKGROUND OF THE DISCLOSURE

Previously, there have been attempts to provide a flexible, economical and reliable control system to regulate the operational characteristics of vehicle turbochargers used in association with internal combustion engines. Presently, the most common control for turbocharger operation is an exhaust waste gate. The waste gate controls output pressure of the turbocharger by bypassing exhaust gas around the turbine portion or driving side of the turbocharger. The waste gate control technical is used on racing engines and subsequently has been adapted to use on other vehicles where increased performance is desired from a given engine. One disadvantage of the waste gate technic is its relative inflexibility in controlling boost and turbocharger operation in accord with engine requirements. Another disadvantage is the thermal inefficiency resulting from bypassing the exhaust energy of a portion of the exhaust.

A more efficient, flexible and therefore desirable process or technic for controlling the operation of a turbocharger is to selectively vary the size of the turbocharger's intake for the exhaust gases. Using this technic, the turbine side or driving portion of the turbocharger is continuously exposed to a regulated exhaust flow and thus the speed of the turbocharger may be easily maintained at a desired operational speed. Resultantly, the turbocharger is controlled to be always ready to generate sufficient boost pressure for the engine as dictated by the operator's throttle movement. A particularly desirable type of intake control for a turbocharger turbine utilizes a plurality of pivotally mounted vanes which are circularly arranged about and upstream of the turbocharger's turbine blades. These vanes control and direct the exhaust gas flow to the turbine portion and specifically the turbine blades. The vanes are interconnected and are mounted so that they pivot or move simultaneously between a more closed position and a fully open position. In a more closed position, overlapping portions of the vanes substantially inhibit exhaust gas flow to the turbine blades. In a fully opened position, the vanes are least inhibitive to exhaust gas flow. Prior U.S. Pat. Nos. which disclose variable turbochargers of this type are: 4,179,247 to Osborn; 4,378,960 to Lenz; 4,403,913 to Fisker.

SUMMARY OF THE INVENTION

The previous background discussion has identified a particular type of exhaust inlet controlled or regulated turbocharger to which the control system of the subject application relates. The subject application claims a simple and economical control system and apparatus which positions the inlet vanes of a variable capacity turbocharger so that the turbocharger quickly generates a response desirable for the vehicle engine needs. The subject turbocharger control consists of a fluid pressure responsive actuator including a movable member which is operatively connected to the inlet vanes. In a preferred embodiment, the movable member is connected to p different fluid pressures. One side of the diaphragm is fluidly connected to the engine's intake manifold or to atmosphere as controlled by selectively activated valve means. The other side of the diaphragm is fluidly connected to the outlet of the turbocharger's compressor or to atmosphere by another selectively controlled valve. A computer or electronic control unit (ECU) energizes or activates the valves. The pressure balance positions the diaphragm to a desired position corresponding to engine operational needs.

In the system so far described, the valve actuation is controlled by the ECU. In other words, the valves may be either opened or closed. The valves may also be cycled between the two positions at varying frequencies to produce a different result than when either opened or closed. However cycling of the valves is not particularly desirable since it may decrease the life of the valves or otherwise reduce durability. Accordingly, the subject control is designed so that during most of the time a vehicle is operated it functions to position the valves than cycled between the open and closed positions. For example, a vehicle and its engine operates in a deceleration mode only a relatively small portion of the time. Therefore the control apparatus is designed to utilize cycling during the deceleration mode as opposed to the operation during a normal idle operation which does not cycle the valves. Likewise, the valves do not cycle during the period when a vehicle engine operates in a normal cruise mode which is a large portion of the time. Reference is hereby made to the SAE Technical Paper Series, number 860107, entitled "Variable Geometry Turbocharging with Electronic Control" by Joseph F. Moody.

From a reading of the above identified SAE publication, it is clear that the selection of a relatively large sized turbocharger relative to a given engine greatly increases performance potential, particularly at higher engine speeds but the response of the turbocharger to performance changes on the engine suffers. This produces an undesirable time lag between when a throttle is opened and when the turbocharger may achieve a sufficient speed to produce the desired result. Conversely, selection of a relatively small sized turbocharger increases low speed engine performance adequately but may not be adequate for increased performance at higher speeds. The small turbocharger selection decreases or substantially eliminates any time lag but requires means such as a wastegate at higher speeds to prevent undesirable overspeed of the turbocharger. This produces thermal inefficiencies.

A variable geometry type of turbocharger effectively acts both as a small and as a large sized turbocharger, all in one device. When the turbine inlet is restricted to exhaust flow, which usually corresponds to operation of an engine at lower speeds, the exhaust gases passing through the turbine is adequate to drive the turbocharger shaft at a desired high speed. Resultantly, the turbocharger's response to rapid opening of the throttle is very good as opposed to the response of a larger sized fixed geometry turbocharger at these lower speeds. When the inlet of the turbine portion is more opened up, usually occurring at higher vehicle and engine speeds, less exhaust back pressure is generated and increased power is a result. The engine responds to utilize the increased air flow from the compressor portion of the turbocharger.

It has been found that in a specific engine/vehicle combination, a properly sized variable geometry turbocharger should operate a great percent of the time with turbine inlet controls or the inlet vanes set within a range of about 40–50% opened from a closed position. A setting in this range will provide both desired engine and vehicle operation under typical steady state cruise conditions and desirable throttle response and sufficient power generation for good acceleration without an undesirable time lag.

The subject control for turbocharger inlet geometry will economically provide the above described functional objectives. Basically, the control utilizes a pressure powered actuator to position the inlet vanes. The actuator has a movable member attached to a movable diaphragm which separates two chambers. One chamber is fluidly connected to the intake manifold of the engine and the other chamber is fluidly connected to the compressor's outlet. Selectively controlled valves in each fluid connection regulate the level of manifold pressure and compressor outlet pressure admitted to the chambers in accord with engine throttle, speed, temperature and other relevant considerations. These relevant considerations form an input to a computer or electronic control unit (ECU). Outputs of the ECU control the valves.

Other features and desirable characteristics of the subject control for variable geometry turbochargers will be more readily apparent from a reading of the following detailed description, with reference to the drawings of a preferred embodiment described hereafter.

DESCRIPTION OF AN EMBODIMENT

Figure 1:
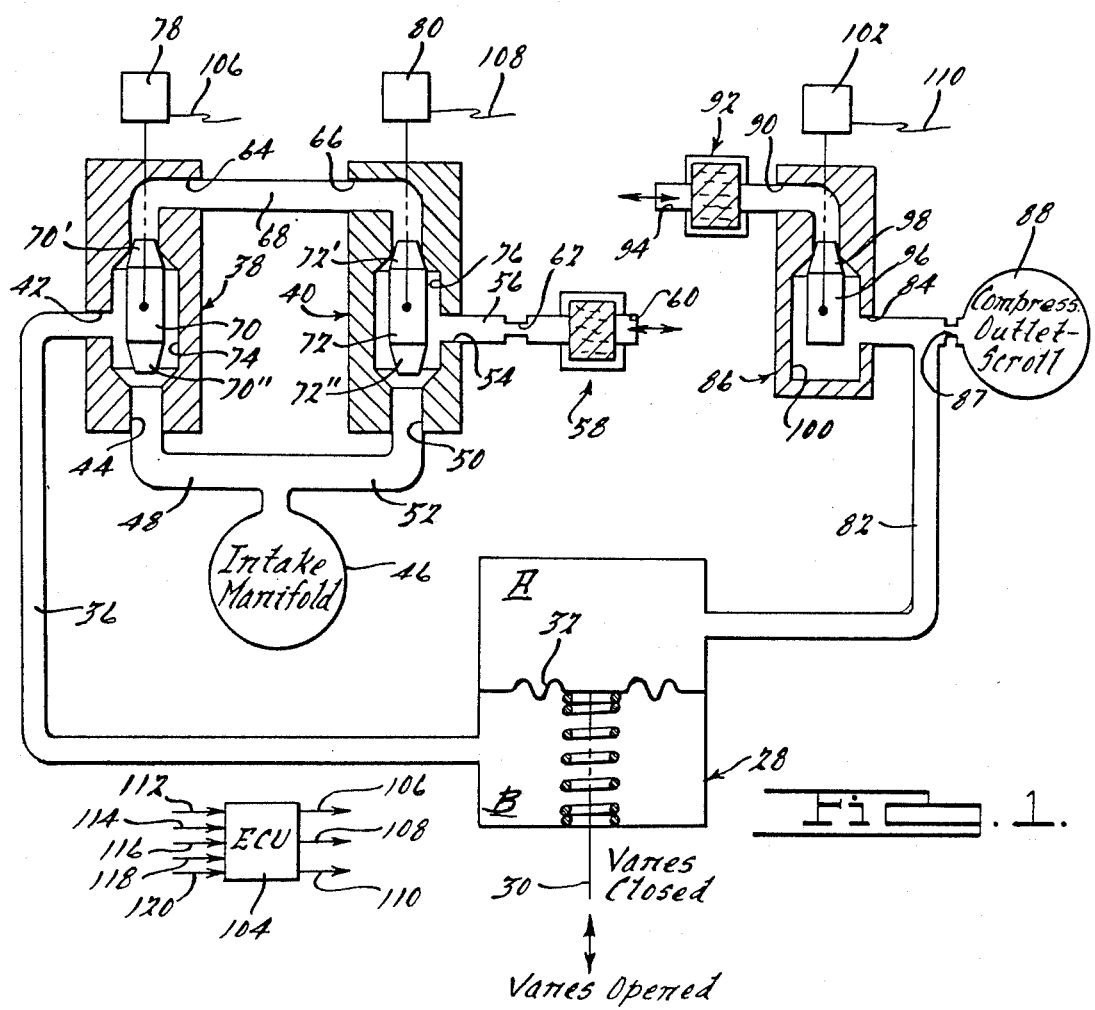
FIG. 1 is a somewhat schematic and sectioned view of the turbocharger control to regulate inlet vane position.
Figure 2:
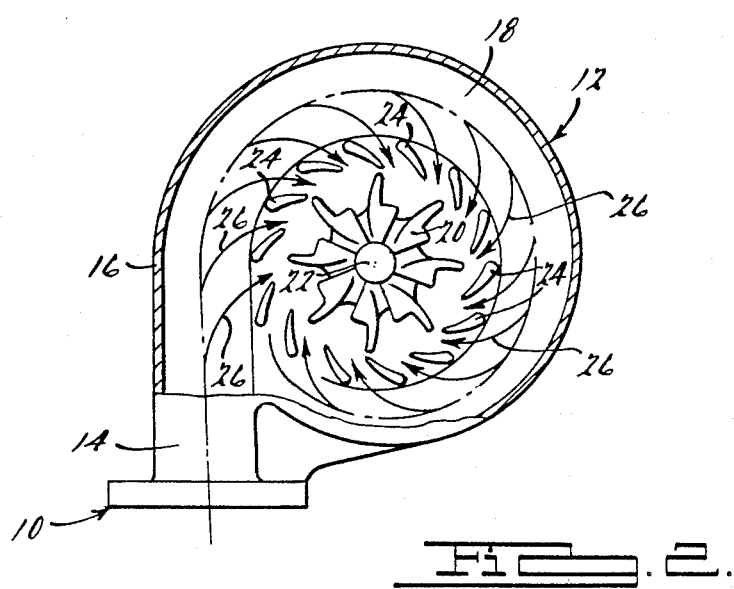
FIG. 2 is an end view of the turbocharger's turbine portion revealing movable inlet vanes which control exhaust gas flow admitted to turbine blades supported on a shafted wheel.
Figure 3:
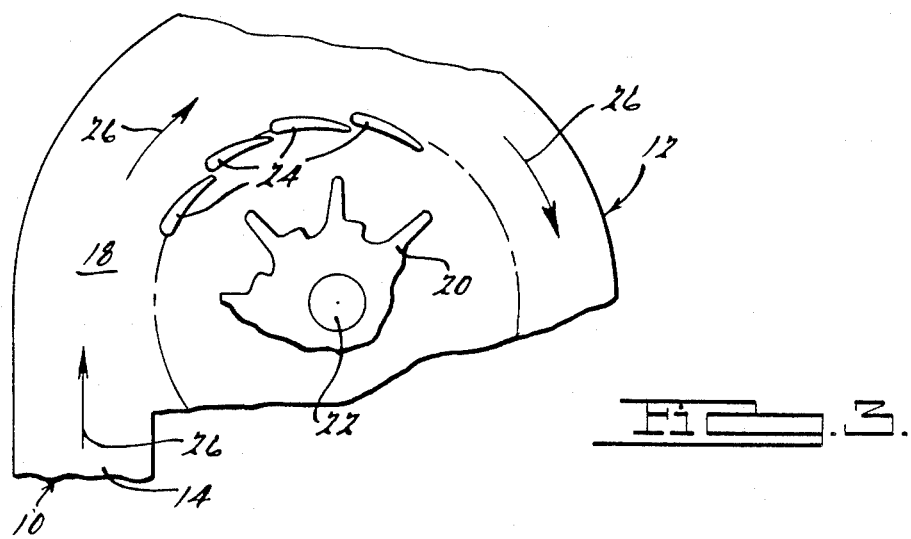
FIGS. 3–5 are views similar to FIG. 2 but showing three different positions of the inlet vanes.
Figure 4:
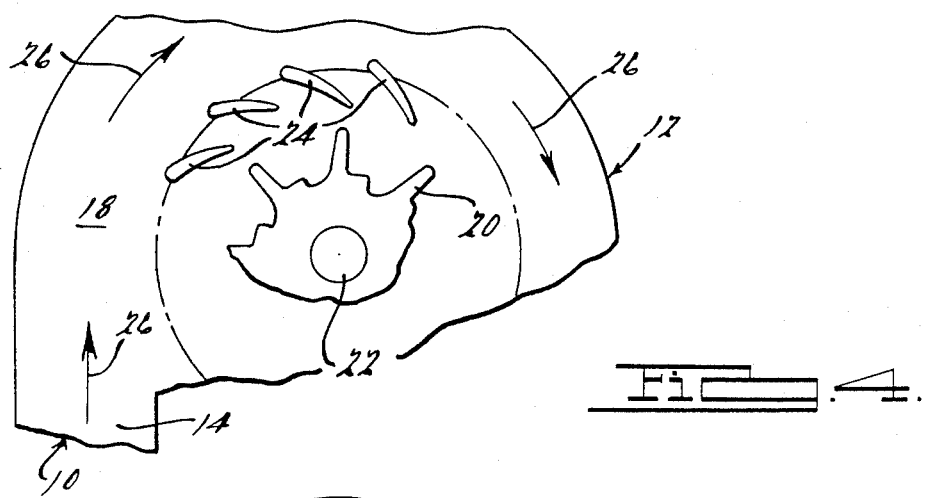
Figure 5:
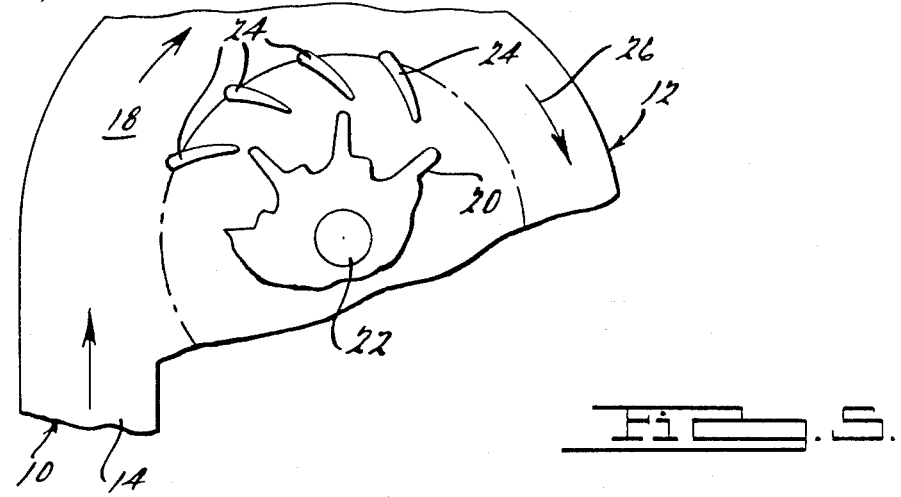
Figure 6:
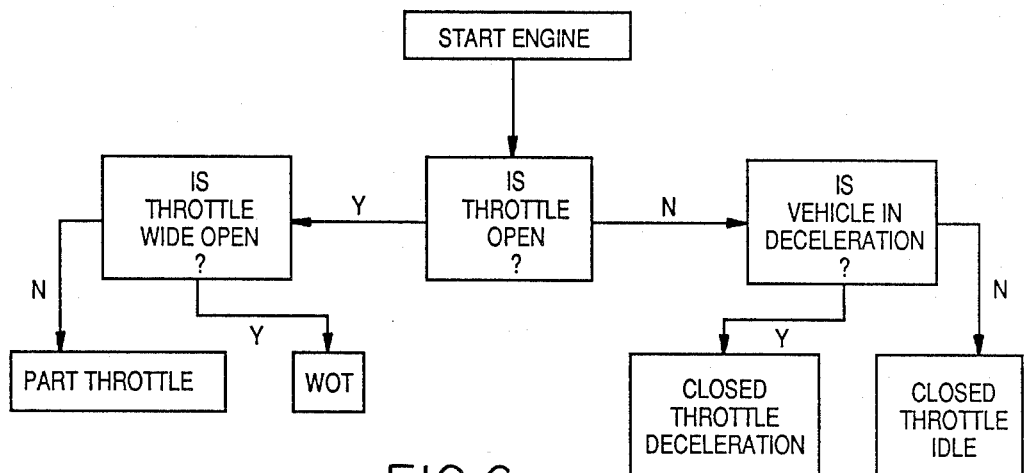
FIG. 6 is a flow chart of the control system showing the four possible operative engine conditions discussed hereinafter.
Figure 7:
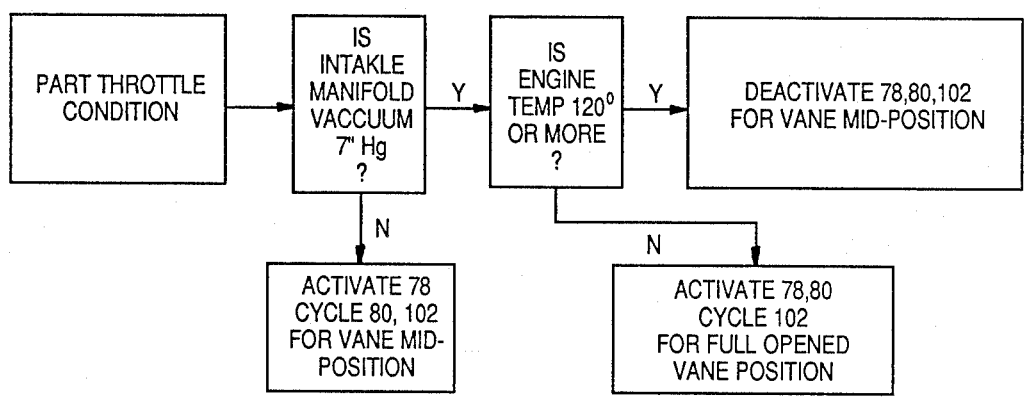
FIGS. 7–10 are continuations of the flow chart in FIG. 6 showing further details for each of the four operative engine conditions.
Figure 8:
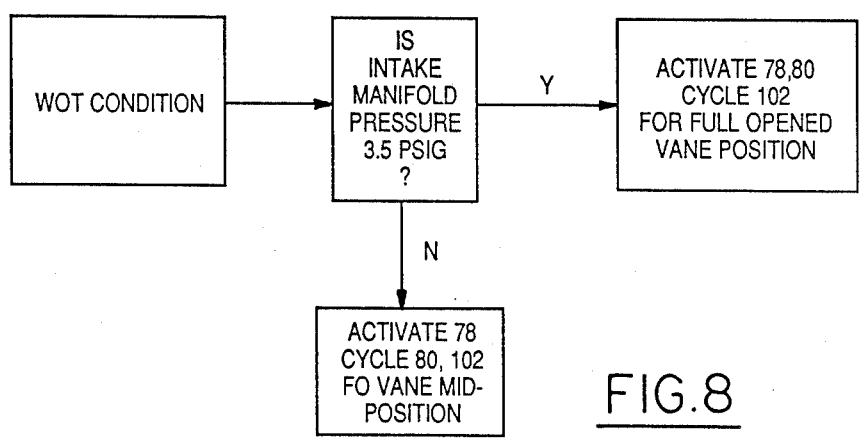
Figure 9:
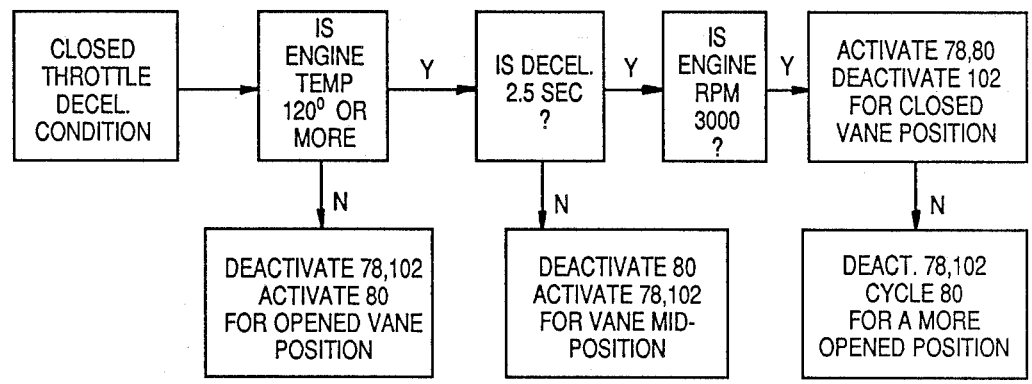
Figure 10:
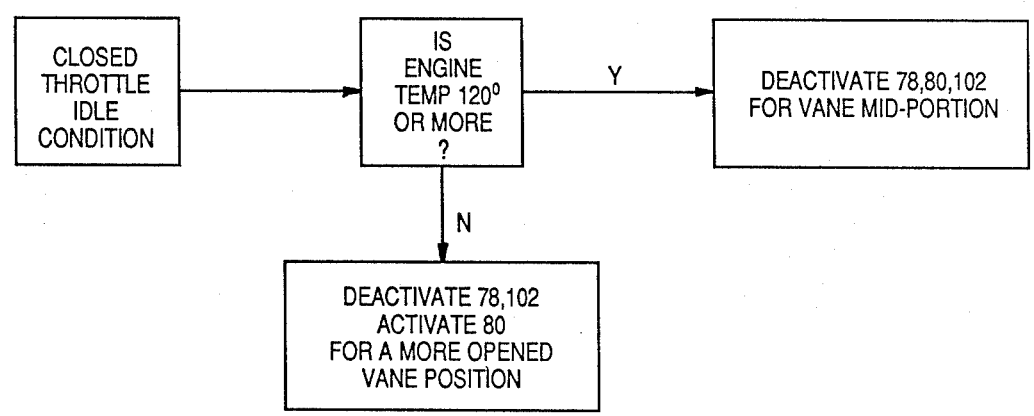

In FIG. 1, a control for positioning a plurality of pivotally mounted vanes of a variable geometry turbocharger is shown. In FIG. 2, an end view of a turbine portion or side of a variable geometry turbocharger is shown. The turbocharger assembly 10 includes turbine portion 12 which has inlet defining means 14 to admit engine exhaust gases to the turbine. The turbocharger 10 and particularly the turbine portion 12 includes a generally hollow housing or enclosure 16 like a scroll or a spirally extending interior gas passage 18. Passage 18 extends from the inlet 14 to a centrally located turbine wheel 20 having a plurality of blades as is known in the turbocharger art. The turbine wheel 20 is attached to a shaft 22 in accord with the typical practice in turbocharger construction. A plurality of pivotally mounted vanes 24 are placed in the gas passage 18 and encircle the turbine wheel 20. The vanes 24 have a generally tear drop cross-sectional configuration with a rounded leading edge relative to the gas flow passing to the turbine wheel as indicated by numeral 26. The vanes 24 are pivotal about axes extending normally to the plane of the drawing (FIG. 2). The axes are located adjacent the rounded end as is made clearer from FIGS. 3–5. In FIGS. 3–5, the vanes are illustrated first in a closed operative position, then in a normal cruise or 40–50% opened position and finally a fully opened position.

Functionally, vanes 24 are interconnected so that they pivot simultaneously. This movement is by a means including the fluid pressure responsive actuator or positioner 28 of the control shown in FIG. 1. The actuator 28 has a linearly movable output member 30 (shown schematically). One end of the output member 30 is attached to a movable diaphragm 32. The opposite end of member 30 is attached to a vane connector mechanism (not shown) so that liner movements of member 30 are transmitted and transformed into pivotal movements of the vanes 24. The specific vane connector mechanism does not form a part of the subject invention. Examples of suitable mechanisms to accomplish the above described operation are disclosed in the previously identified patents.

In FIGS. 3–5, three of the many possible vane positions are illustrated. In FIG. 3, the vanes 24 are shown in a substantially closed position which offers maximum restriction to gas flow into the turbine. This position is relatively uncommon in that it produces high exhaust back pressures on the engine. However, when the exhaust flow are relatively low and the vanes are just slightly opened, there will be sufficient flow to produce desirable turbocharger rotation necessary for a rapid response to subsequent throttle openings.

In FIG. 4, the vanes 24 are illustrated in a partially opened position and specifically at about 40–50% from the closed position. With the variable geometry or inlet type turbocharger, this position represents a desired "working" position and corresponds to a very common operating position for a large part of the engine's operation. This vane position maintains desirable rotation of the turbocharger so that it still responds quickly to increased throttle demands such as when the throttle is suddenly opened from the cruise position. This opening position also is sufficient during much of the cruising operation of the vehicle so that the turbocharger has a desired and significant effect on engine performance.

In FIG. 5, the vanes 24 are positioned in a fully opened position. This operational position or mode does not occur nearly as often as the cruise position shown in FIG. 4 but corresponds, for example, moving the throttle to wide open when the vehicle is operated on the highway. This might occur during a passing maneuver.

In FIG. 1, the subject turbocharger control is illustrated. As previously mentioned, the vane positioning is controlled by the movement of members 30, 32 of the actuator 28. As indicated in FIG. 1, upward movement of members 30, 32 tends to move the vanes 24 toward a closed position and downward movement tends to move them toward an open position. A spring 34 in the actuator 28 exerts a force on member 32 which tends to move members 30, 32 toward the closed vane position.

The actuator 28 is generally hollow and defines two chambers A and B which are separated by the movable diaphragm 32. Chamber B is fluidly connected by conduit means or a tube 36 to valve means which specifically include two selectively activated valves 38 and 40. The first valve 38 has an inlet port 42 connected to the tube 36 and an inlet port 44 connected to the engine's intake manifold 46 by another conduit or tube 48. Thus, when in the deactivated condition shown in FIG. 1, vacuum pressure from the manifold 46 is directly connected to the chamber B.

The second valve 40 has an inlet port 50 which is connected by conduit or tube 52 to the intake manifold 46. Valve 40 also has a second port 54 which is connected by conduit 56 to a filter assembly 58. Filter assembly 58 fluidly communicates with the atmosphere through opening 60. The fluid communication between atmosphere and the port 54 is limited by a reduced diameter or orifice 62 therebetween. When in the deactivated condition shown in FIG. 1, vacuum pressure originating from the intake manifold 46 and as transmitted to chamber B is subject to a bleed of air at atmospheric pressure through the opening 60. This reduces the vacuum strength and its effect on the diaphragm 32 of the actuator 28.

Each of the valves 38 and 40 have other ports 64 and 66, respectively. The ports 64 and 66 are interconnected by a conduit or tube 68. Each of the valves 38 and 40 have a movable valving member 70 and 72, respectively. The members 70, 72 are movable within enlarged interior spaces 74 and 76 of valves 38 and 40, respectively. The upper ends 70' and 72' of members 70 and 72 seal the ports 64 and 66 when the valves are in the illustrated deactivated condition.

The valving members 70 and 72 are operably connected to value control devices 78 and 80, respectively. These devices are preferably in the form of electrically powered solenoid devices, each having a normal deactivated and biased position corresponding to the illustrated positions of valves 70, 72 in FIG. 1. When activated, the devices 78, 80 move the valving members 70, 72 downward so that the lower end portions 70" and 72" seal the ports 44 and 50 respectively. When both of the valves 38 and 40 are in the activated condition, chamber B is directly connected to atmosphere through ports 64, 66 and orifice 62. Meanwhile, the intake manifold is isolated from atmosphere and the chamber B.

Chamber A of the actuator 28 is fluidly connected by a conduit or tube 82 to a port 84 of a third selectively activated valve 86. The port 84 is also connected to a source 88 of pressurized air downstream from the compressor portion of the turbocharger assembly 10. Valve 86 includes another port 90 which is connected through a filter assembly 92 and opening 94 to atmosphere. A movable valving member 96 has an upper end portion 98 which seals the port 90 when the valving member 96 is in the deactivated condition illustrated in FIG. 1.

In the deactivated position of valve 86, the valving member 96 exposes chamber A to the pressurized air from the compressor side or outlet of the turbocharger. The pressurized air in chamber A tends to move the diaphragm 32 and member 30 downward. Downward movement moves the turbocharger's vanes toward a more opened position (see FIGS. 4,5).

The valving member 96 is housed and is movable in an enlarged interior 100 of the valve 86. The member 96 is operationally connected to a solenoid device 102 like the other devices 78, 80. When activated, the device 102 moves the valving member 96 downward and exposes chamber A to air at atmospheric pressure. When the scroll pressure source 88 of the compressor is generating significant air pressure, this atmospheric exposure reduces pressure in chamber A which tends to allow movement of the diaphragm 32 and member 30 upward. This movement corresponds to a movement of the vanes toward a more closed position (see FIGS. 3,4).

The solenoid devices 78, 80 and 102 are subject to individual and selective activation so that the valving members 70, 72, 96 apply desired levels of pressurized fluid to chambers A and B of the actuator 28. Resultantly, the vanes 24 are positioned for prevailing or anticipated engine and vehicle operative conditions and a corresponding desired turbocharger action is produced. The selective activation is accomplished by means of a computer or electronic control unit (ECU) 104 which receives engine and vehicle related inputs, then selects a desired action in accord with a program and finally generates an output or outputs to be transmitted to devices 78, 80 and 102. The devices may be fully activated so that the respective valving members move to the opposite position from that shown in FIG. 1 or the devices may be cycled between deactivated and activated positions at varying frequencies.

In FIG. 1, the ECU 104 has three outputs 106, 108 and 110. These outputs correspond to the identically labeled leads of the devices 78, 80 and 102. The ECU 104 has five inputs 112, 114, 116, 118 and 120. Input 112 feeds the ECU with engine temperature data. Input 114 feeds the ECU with engine speed data. Input 116 feeds the ECU with vehicle speed data. Input 118 feeds the ECU with intake manifold pressure data. Input 120 feeds the ECU with throttle angle data.

OPERATIONAL MODES

The operation or function of the turbocharger and its control under various engine and vehicle operational modes is as follows. Upon starting a cold engine and before it reaches a desired operating temperature of say 120 degrees F., the engine is run at a higher than normal idle speed. Under these conditions, the engine is vulnerable to stalling and may exhibit relatively poor drivability if a substantial load is demanded of the engine by opening the throttle. Accordingly, it is undesirable to interfere with normal air delivery to the engine. Also, under these conditions, the desirability of substantial turbocharger boost is reduced. Therefore, the ECU 104 directs a mode where the devices 78, 80 and 102 and their corresponding valves 38, 40 and 86 are in the deactivated, activated and deactivated conditions, respectively. In other words, the respective valving members 70, 72 and 96 are up, down and up respectively. Resultantly, chamber B is solely connected to manifold vacuum pressure without any air bleed through valve 40. The control actuator 28 responds primarily to vacuum pressure in chamber B since low levels of scroll pressure are generated under these conditions and thus the vanes are maintained in a relatively opened position determined by the balance between vacuum strength, the force of spring 34 as opposed to the scroll pressure strength. However, the actuator 28 is capable of moving toward the more closed position as vacuum pressure weakens due to throttle opening. Such a move toward the closed position will increase turbocharger speed and resultantly build boost or scroll pressure.

After an idling engine achieves the desirable operating temperature of 120 degrees F., the engine stability is much improved and can better tolerate the effects on intake manifold vacuum caused by air bleed allowed by deactivation of actuator 80 and the movement of valve 40 to the upward position illustrated in FIG. 1. Under these steady-state idle condition, the ECU 104 directs all of the devices 78, 80 add 102 to allow valves 38, 40 and 86 to assume the illustrated deactivated positions. Resultantly chamber B of activator 28 is exposed to a regulated vacuum produced by the manifold 46 and orifice 62. Accordingly, the vanes are positioned between the closed position of FIG. 3 and the open position of FIG. 5. It is calculated that a vehicle and its engine are typically idled about 12% of the time of use. As explained above, the devices 78, 80 and 102 and their valving members 70, 72 and 96 are not cycled during the idle mode and in fact only device 80 is even activated at all and then only during engine warm-up. This desirable feature of the subject control increases the reliability and life of the components.

During what is called a launch mode, the stationary vehicle is put in gear and the throttle is opened. When this occurs, the ECU 104 rapidly activates device 78 and deactivates devices 80 and 102 which places the valving members 70, 72 and 96 in downward, upward and upward positions. This closes off chamber B from both the manifold 46 and bleed opening 60 and resultantly traps the previous vacuum level in chamber B. The communication of scroll pressure from source 88 to chamber A acts against the trapped air in chamber B. This transient action holds the diaphragm in its previous midposition and retains the vanes in a corresponding desired midposition. Without this transient blocking action, the rapid weakening of the vacuum strength in chamber B caused by throttle opening would allow the actuator to move the vanes to closed position at the same time that an increased flow of exhaust gases was acting on the turbine. Undesirable overspinning of the turbocharger would result as well as excessive exhaust backpressure which would substantially inhibit engine torque output. It is calculated that the launch mode is used during only about one percentage of the vehicle use.

Under a similar operative condition to the launch mode described in the previous paragraph, the throttle is opened while the vehicle is moving. This operational mode is referred as the tip-in mode. Under this transient tip-in mode, only relatively low scroll pressure is available for chamber A and only a relatively weak vacuum strength is available for or in chamber B. To prevent the spring 34 from moving the diaphragm 32 and vanes to a closed position and thus produce overspinning of the turbocharger and high exhaust backpressure, the devices 78 and 80 are activated and deactivated respectively as before causing valving members 70 and 72 to trap the air in chamber B. However, the device 102 is cycled between activated and deactivated positions by the ECU 104. This holds the normal midposition despite the increasing scroll pressure directed to chamber A which otherwise would cause the vanes to open more than the normal midposition. It should be noted that the calculated operation in the tip-in mode occurs during only about 1% of the vehicles use. Thus, the cycling of device 102 and valving member 96 is not excessive.

A large percentage of vehicle operation is in a part-throttle cruise mode. It is calculated that this mode of operation occurs during about 39% of the vehicles use. Much of the part-throttle operation occurs with the manifold vacuum strength greater than about 7" of mercury whether or not the engine is below 120 degree F. or above this temperature. Ween in the part-throttle mode with such vacuum conditions and the engine below a 120 degree F. temperature, the ECU 104 deactivates devices 78 and 102 and activates device 80. This moves valve member 72 downward from the position in FIG. 1. Resultantly, the control action is exactly alike its action during the idle mode at these same warm-up engine temperatures. Again, chamber B is exposed to unmodified vacuum or air pressure in the intake manifold 46 and chamber A is exposed to compressor outlet or scroll pressure. The balance between pressures in A and B and the force of spring 34 tend to maintain the vanes in a desirable midposition of about 40–50% from the closed position.

During part-throttle engine operation with a vacuum strength of 7" mercury or greater and the engine temperature above about 120 degree F., all three of the devices and the valving members are in the deactivated condition shown in FIG. 1. This control mode corresponds exactly with the mode during idle when the desired operating temperature is achieved. The actuator 28 then assumes a midposition by the balance between pressures in chamber A and B and the force of spring 34. During part-throttle operation with intake manifold pressure between a vacuum strength of 7" of mercury and a positive pressure of 1.5 psig, the ECU 104 activates device 78 and thus member 70 is in the downward position. Dependent on the level of the manifold pressure, the other two valves are cycled to maintain the vanes at about the normal cruise or 40–50% position. It is calculated that the vehicle operates during wide open throttle operation only about 26% of the vehicle use. In this operational mode, the ECU causes the valving member 70 to assume the downward position in FIG. 1. If the manifold pressure is greater than 3.5 psig, the ECU causes the valving member 72 to assume the downward position. Otherwise the valving member is cycled. In both situations, the ECU causes the valving member 96 to cycle position shown in FIG. 5.

The final significant operational mode of the engine and associated turbocharger control is during deceleration of the vehicle. Deceleration is calculated to occur about 21% of the vehicle's period of use. Deceleration when the engine temperature is less than 120 degrees F. requires a control function identical to the function during idle and part-throttle operation with a cold engine. The ECU allows valving members 70 and 96 to assume the positions as in FIG. 1 and causes the valving member 72 to assume a downward position. There is no cycling and resultantly, the vanes are held in the fully open position. During a short deceleration of less than about 2.5 seconds with a warmed engine, the ECU allows valving member 72 to retain its normal up position and causes the valving members 70 and 96 to assume the down positions. This retains the previous pressure level in chamber B and decreases the pressure in chamber A by bleeding scroll pressure through the opening 94 to atmosphere. This causes the vanes to move toward the midposition which has the effect of allowing the turbocharger speed to be maintained at a useful level despite decreased exhaust flow and input energy into the turbocharger during deceleration.

During a longer deceleration of greater than 2.5 seconds with a warm engine and an engine speed less than about 3000 RPM, the ECU allows the valving member 96 to retain its normal deactivated positions shown in FIG. 1. At the same time, the ECU causes the valving members 70 and 72 to move downward into their activated operational positions In this mode, the chamber B is vented and the vanes are allowed to move to the full closed position in anticipation of subsequent throttle opening motions where, at this diminished engine RPM, exhaust gas flow and therefore turbine wheel input energy is at a low level.

During a deceleration of greater than 2.5 seconds with a warm engine and an engine speed greater than about 3000 RPM, the ECU allows valving members 70 and 96 to remain in their deactivated (up) positions shown in FIG. 1 but causes the valving member 72 to cycle. Resultantly, the vanes are maintained in a mid to opened position depending on engine speed by the balance of pressure forces in actuator 28 and the force of spring 32.

The operation of the system which is described above is perhaps more clearly understood by reference to FIGS. 6 to 10. They graphically illustrate the operation as presented in the previous paragraphs.

From the above detailed discussion of the control and its function, it can be readily understood that the control of this application is a simple, reliable, economical and flexible apparatus for effectively controlling a variable geometry or movable inlet vane type turbocharger. It also can be readily understood that modifications to the control are possible without falling outside the scope of the following claims which define the invention.

I claim:

1. In association with an internal combustion engine having an intake manifold and including a turbocharger with an exhaust gas driven turbine portion and with an air compressor portion, the air compressor portion having an outlet for supplying pressurized air to the intake manifold and the turbine portion having a variable sized inlet assembly, exhaust gas flow through the variable inlet assembly being selectively regulated by a plurality of pivotally mounted vanes movable between open and closed operative positions to control gas flow to the turbine, an inlet vane control for positioning the movable vanes in accord with vehicle add engine characteristics, comprising:

a vane positioning means including a member movable in response to the balance of opposing forces imposed thereon by first and second pressurized fluids;

means operatively connecting the movable member and the pivotal vanes, whereby movement of the movable member is transmitted to the vanes so that they are pivoted simultaneously between closed and open operative positions, characterized by a substantially inhibited exhaust gas flow to the turbine and a relatively uninhibited gas flow to the turbine, respectively;

first fluid transmission means for regulating the passage of the first pressurized fluid from the intake manifold to the pressure responsive positioning device;

second fluid transmission means for regulating the passage of the second pressurized fluid from the compressor outlet to the pressure responsive positioning device;

the first fluid transmission means including a pair of selectively controlled valves, the first valve connecting the intake manifold directly to the positioning device when in a deactivated operative mode, the second valve connecting the intake manifold to a restrictive atmospheric bleed when in a deactivated mode, the first and second valves connecting the positioning device to the restrictive atmospheric bleed when both are in an activated operational mode, the valves combining to disconnect the positioning device from both the intake manifold and the atmospheric bleed when the first valve is activated and the second valve is deactivated, the valves combining to without communication with the atmospheric bleed when the first valve is deactivated and the second valve is activated;

the second fluid transmission means including a third valve which connects the compressor outlet and the positioning device when in a deactivated operative mode and which connects the compressor outlet and the positioning device to a flow restricted atmospheric bleed when in an activated operative mode, whereby the compressor outlet pressure may be modified by a continuous activation of the valve or by a cycled activation/deactivation of the valve;

means for selectively activating and deactivating the three valves in accordance with vehicle and engine manifold pressure, throttle movement and vehicle speed, the means selectively controlling the three valves to produce desired first and second fluid pressures for activating the positioning device and thus positioning the vanes, whereby the vanes are pivoted between open and closed positions and are maintained near a midposition during a large portion of the vehicle and engine operation by either activating or deactivating the valves without any activate/deactivate cycling which is reserved only for infrequent vehicle and engine operations.

2. In association with an internal combustion engine having an intake manifold and including a turbocharger with an exhaust gas driven turbine portion and with an air compressor portion, the air compressor portion having an outlet for supplying pressurized air to the intake manifold and the turbine portion having a variably sized inlet assembly, exhaust gas flow passing through the inlet assembly being regulated by a plurality of pivotally mounted vanes which are movable between open and closed operative positions to control the gas flow to the turbine, an inlet control for positioning the movable vanes in accordance with vehicle and engine operative characteristics, comprising:

a pressure responsive device having a movable member with opposite side surfaces, one side partially defining a first pressure chamber and another side partially defining a second pressure chamber;

means operatively connecting the movable member and the pivotal vanes, whereby a balance of pressure generated forces on the sides of the movable member simultaneously pivots the vanes between a closed position in which gas flow is substantially inhibited to the turbine and an opened position in which gas flow is substantially uninhibited;

a first conduit means fluidly connecting the first pressure chamber with the engine's intake manifold;

a second conduit means fluidly connecting the second pressure chamber with the air outlet of the compressor;

the first connecting means including a pair of selectively controlled valves for regulating communication between the interior of the intake manifold and the first chamber, the first of the valves including a deactivated rest condition which directly connects the intake manifold with the first chamber and an activated condition which both blocks this direct connection and unblocks another connection with the other valve;

the second of the pair of valves besides being connected to the first valve also being connected to the intake manifold and to a flow restricted outlet to the atmosphere, whereby the second valve has a deactivated rest condition which both blocks the connection to the first valve and connects the intake manifold with the atmospheric bleed outlet and has an activated condition which both blocks the connection to the intake manifold and opens the connection to the first valve whereby the first chamber of the positioning means is connected to the atmospheric bleed outlet through the first valve when both valves are in activated conditions;

the other fluid connecting means including a third selectively controlled valve connected to the compressor outlet, to the second pressure chamber and further to an atmospheric outlet through a flow restriction, the third valve having a deactivated rest condition blocking the atmospheric outlet and a activated condition connecting the atmospheric outlet with both the compressor outlet and the second chamber;

means for selectively activating and deactivating the three valves in accordance with vehicle and engine operative characteristics such as engine temperature, engine speed, manifold pressure, throttle movement and vehicle speed to generate pressure forces on the opposite sides of the positioner's movable member and thus a net pressure balance force thereon to position the movable member desirably, whereby the vanes are pivoted between open and closed positions and are maintained at or near a midposition for a large portion of vehicle and engine operation, the vane midposition corresponding to a normal partially opened cruise position and being established by either activating or deactivating combinations of the valves without any activate/deactivate cycling which cycling is reserved for infrequent vehicle and engine operation.

3. The control set forth in claims 1 or 2 in which the positioning device includes a hollow enclosure with a flexible diaphragm separating its interior into the two chambers; the first valve has a hollow body portion defining an elongated interior space enclosing an elongated movable valving member and the connection to the intake manifold is at a first end of the body portion, the connection to the second valve is at the opposite second end of the body portion and the connection to the positioning device is in between; the second valve has a hollow body portion defining an elongated interior space enclosing an elongated movable valving member and the connection to the intake manifold is at the first end of the body portion, the connection to the first valve is at the second end of the body portion and the connection to the atmospheric outlet is in between; the valving members within the body portions blocking the connections at the first ends when the valves are activated and alternately blocking the connections at the second ends when the valves are deactivated.

4. The control set forth in claim 3 in which the positioning device also includes a spring which applies a force on the diaphragm opposite to the compressor outlet pressure generated force.

5. The control set forth in claims 1 or 2 in which the valves are activated by electrically powered solenoid devices, one for each valve and all being capable of being rapidly cycled between deactivated and activated positions.

6. The control set forth in claims 1 or 2 in which the connections to atmosphere are through restrictive orifices to moderate the pressure effects of changes in intake manifold pressure and compressor outlet pressure.

* * * * *